United States Patent [19]
Evans et al.

[11] 3,898,668
[45] Aug. 5, 1975

[54] INTEGRATED RADIOMETRIC SEEKER GYRO

[75] Inventors: John L. Evans, Oakland, N.J.; Leonard O. Vladimir, Santa Barbara, Calif.; Thomas Hoffmann, Clifton, N.J.

[73] Assignee: The Singer Company, Little Falls, N.J.

[22] Filed: May 15, 1974

[21] Appl. No.: 469,943

[52] U.S. Cl. ............ 343/759; 343/117 A; 343/761; 343/765; 343/837; 74/5.7
[51] Int. Cl. .............................................. H01q 3/00
[58] Field of Search ....... 343/117 A, 759, 761, 765, 343/766, 837, 5.6 D; 74/5.7

[56] References Cited
UNITED STATES PATENTS

| | | | |
|---|---|---|---|
| 3,789,414 | 1/1974 | Bauer et al. | 343/761 |
| 3,824,865 | 7/1974 | Evans et al. | 74/5.7 |

*Primary Examiner*—Eli Lieberman
*Attorney, Agent, or Firm*—T. W. Kennedy

[57] ABSTRACT

A radiometer and gyroscope are integrated in a single unit by coupling part of an antenna directly to the spinning inertial mass or rotor of the gyroscope. In the preferred embodiment a Cassegrain antenna is coupled to a dynamically tuned, wide-angle, free-rotor gyro by connecting the smaller secondary reflector to the gimbal-mounted rotor. A stationary antenna feed and waveguide are arranged inside of the hollow drive shaft. While the rotor, primary and secondary reflectors are spinning, the rotor and secondary reflector attached thereto can be tilted off the spin axis, to which the primary reflector, however, is constrained.

9 Claims, 8 Drawing Figures

PATENTED AUG 5 1975

3,898,668

SHEET 1

3,898,668

INTEGRATED RADIOMETRIC SEEKER GYRO

BACKGROUND OF THE INVENTION

The invention relates generally to the fields of inertial navigation and antennas, and more particularly to gyroscopes and microwave antennas.

All objects emit and reflect electromagnetic radiation. The actual radiated energy collected by a radiometric sensor viewing an object is based on the reflectivity, emissivity and absolute temperature of the object, the reflected sky temperature, and the transmissivity, attenuation and temperature of the atmosphere between the radiometer and the object. In homing missiles a directional radiometer uses the difference in the level of energy radiated (or reradiated) by military targets, especially metal ones, in their normal surroundings for the purpose of searching out, acquiring and tracking (i.e., following) radiometrically distinguishable targets. To utilize the information supplied by the radiometer, the missile requires an inertial navigation system, the heart of which is a gyroscope. An on-board computer determines whether or not the intercept course flown by the missile is optimized based on a fundamental parameter: the rate of change of the angle between the instantaneous couse of the missile and the line of sight to the target.

In the past, the gyroscopic and radiometric functions have been treated separately. In addition to the gyroscopic equipment, the radiometer needs its own platform and drive mechanism for executing a search pattern (scan) and for tracking an acquired target. Moreover, because the radiometer and the gyroscopic are separate, other instrumentation is required to compute the time derivative (rate) of the line of sight angle to the target.

In attempting to integrate the radiometric and gyroscopic functions in one instrument, one would encounter a number of problems beyond the basic problem of selecting compatible gyroscope and microwave antenna configurations. If one attempted to attach an antenna, for example, a parabolic dish with a feed supported at the focus, it would be discovered that the antenna size presented too much inertia to torque rapidly enough in the track mode. In addition because the feed would spin and tilt with the reflector, a complex rotary microwave joint would have to be used to couple the feed to an output waveguide. In the past these problems, if they were recognized at all, were unsurmountable in practice.

SUMMARY OF THE INVENTION

The general purpose of the invention is to combine the radiometric and gyroscopic functions in one instrument.

A practical system has been discovered for integrating a microwave antenna and a gyroscope. In the preferred embodiment a Cassegrain antenna having a relatively large parabolic primary reflector, a much smaller hyperbolic secondary reflector and an antenna feed through the bottom of the primary reflector, is partially coupled to the rotor of a dynamically tuned wide-angle, free-rotor gyro.

The gyroscopic portion of the instrument includes a hollow drive shaft to which a ring-shaped inertial rotor is connected by means of a gimbal mounting with flexure pivots allowing wide-angle tilting of the rotor off the spin axis of the drive shaft. The antenna portion of the instrument comprises an apertured parabolic primary reflector rigidly connected to the end of the hollow drive shaft. A stationary antenna feed and waveguide are disposed inside of the hollow drive shaft so that the antenna feed protrudes through a hole in the bottom of the primary reflector. The secondary reflector is supported by means of struts rigidly connected to the tiltable rotor passing through holes in the primary reflector with enough clearance to permit tilting. Scanning of the antenna is accomplished by appropriately torquing the gyro rotor, which at the same time displaces the small secondary reflector and thus the beam direction of the antenna.

DESCRIPTION OF THE PREFERRED EMBODIMENT

Figure 1:
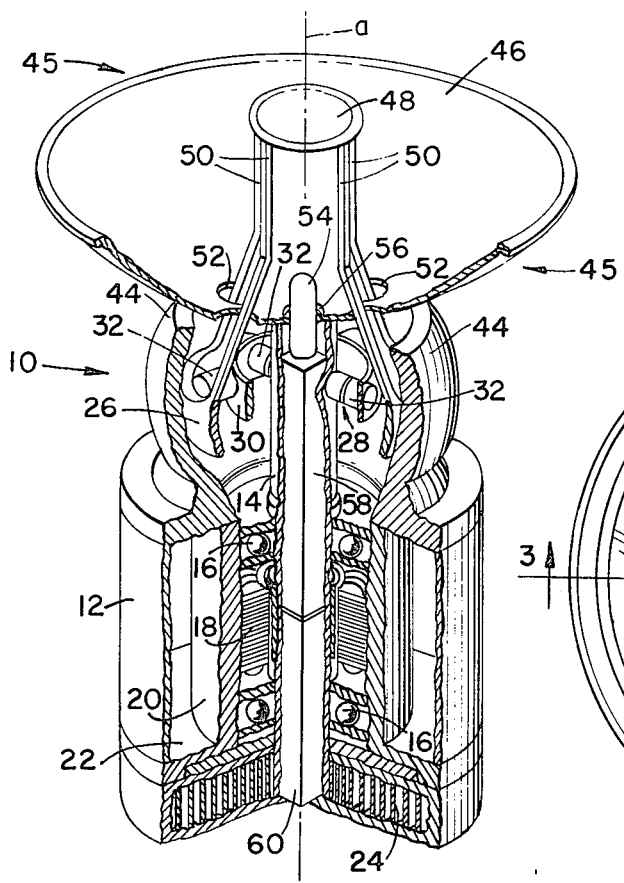
FIG. 1 is a fragmentary, isometric view of the integrated radiometric seeker gyro according to the invention.
Figure 2:
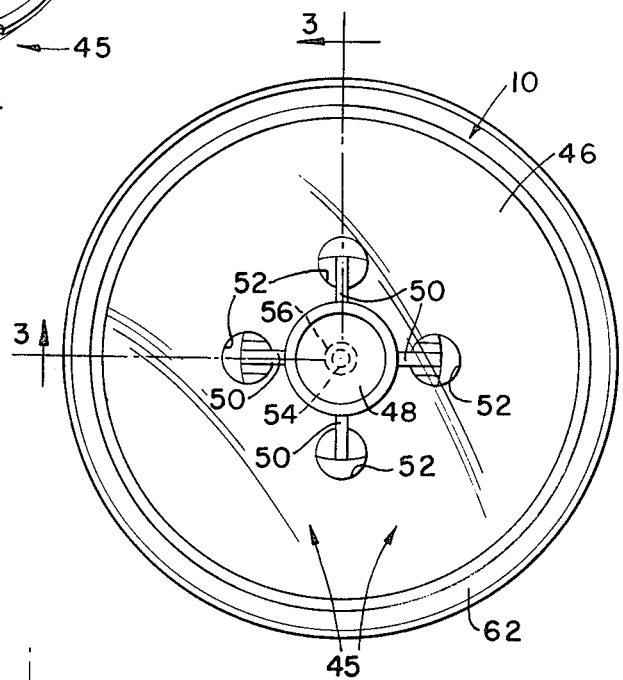
FIG. 2 is a top view of the instrument of FIG. 1 assembled in a casing.
Figure 3:
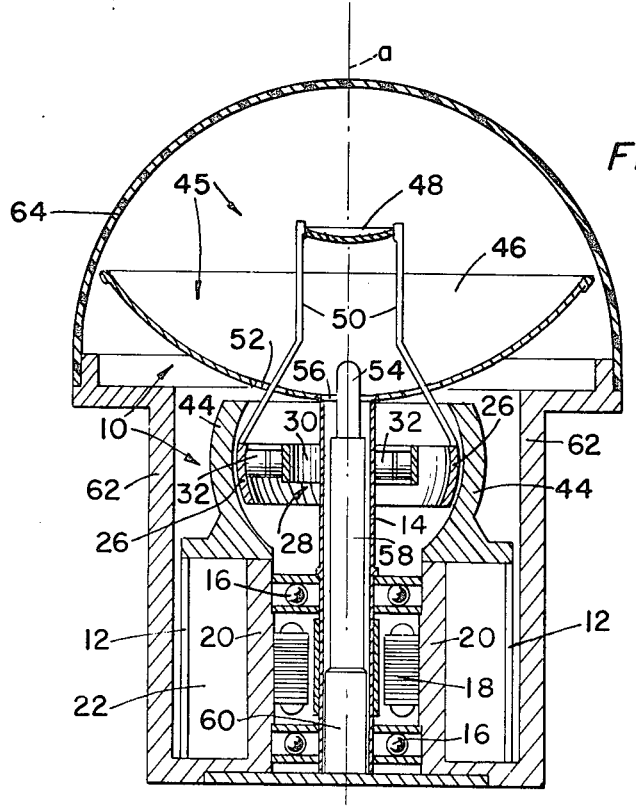
FIG. 3 is a sectional view of the instrument of FIG. 3 taken along lines 3—3 of FIG. 2.

The compact unit comprising the integrated radiometric seeker gyro is shown generally at 10 in FIGS. 1–3. The gyroscopic portion of the instrument includes a cylindrical housing 12 with a coaxially mounted, hollow drive shaft 14 extending the length of the housing, supported by two ball spin bearings 16 and turned by a synchronous electric motor 18 contained within a cylindrical inner housing 20. The annular space 22 between the inner housing 20 and the inside of the outer housing 12 is taken up by the electronics package (not shown). For rapid reaction, it is possible to accelerate the drive shaft from rest up to a speed near the synchronous value, typically 100 hertz, with an auxiliary spring motor 24 at the instrument base.

At the upper end of the drive shaft 14 an inertial rim or rotor 26, in the form of a spherical ring, is directly coupled to the drive shaft 14 by means of a gimbal-mounting 28, having an aluminum inner gimbal ring 30 and two pairs of flexure hinges or pivots 32.

Figure 4:
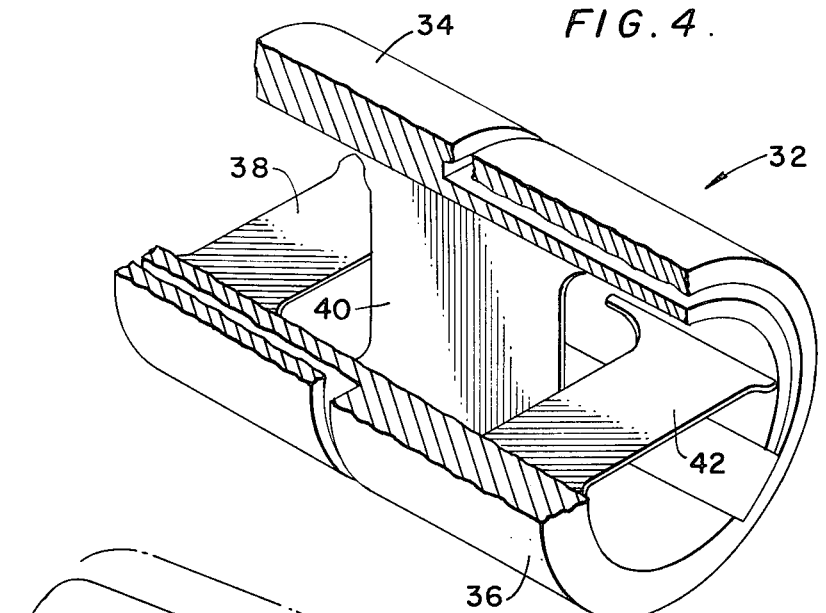
FIG. 4 is an isometric view of one of the flexure pivots of the gimbal mounting in the instrument of FIGS. 1–3.
Figure 5:
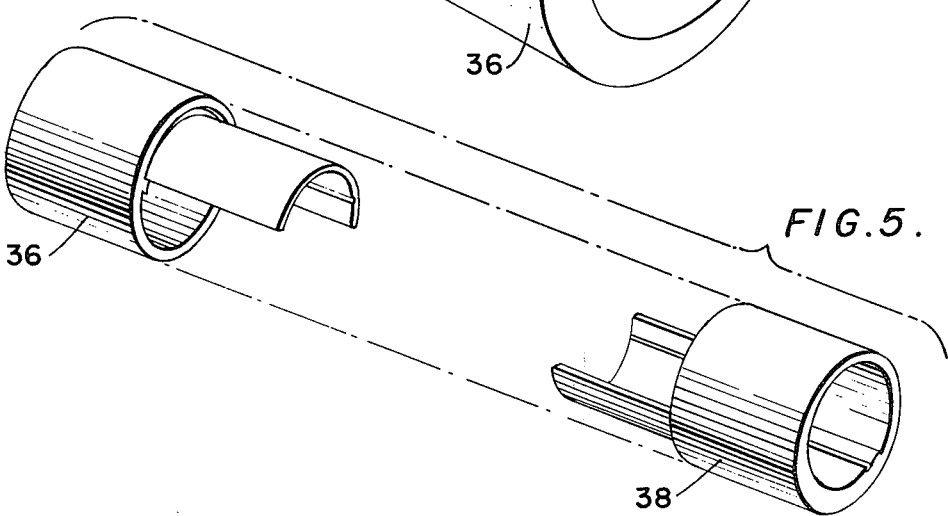
FIG. 5 is an isometric, axially exploded view of the two case halves of the flexure pivot of FIG. 4.

Each flexure pivot 32, as shown in more detail in FIG. 4, includes a pair of mating case halves 34 and 36 interconnected by three flexure beams 38, 40 and 42. By design, the flexure pivots have an angular freedom of plus or minus 60°, which is much greater than that required for the gyro. The total angular freedom of the gimbal 28 (FIGS. 1 and 3) is designed to be about plus or minus 25° in practice. The flexure pivot itself is extremely stiff in 5° of freedom: three translational and two rotational. However, in the third rotational direction, it is as compliant as possible. The purpose of the flexure pivot is to hold a body rigidly in place while permitting it to rotate freely about one, and only one, axis.

In FIG. 1 it can be seen that the rotor or inertial rim and the inner gimbal ring 30 are connected together with one pair of aligned flexure pivots 32 (only one of which is shown in FIG. 1). The inner gimbal ring 30 is connected to the hollow drive shaft 14 by a second pair of aligned flexure pivots 32, orthogonal to the first pair.

The inertial effect of the gimbal mounting 28 on the rotor which manifests itself as a dynamic spring restraint can be cancelled by the real spring of the flexure pivots when the gyro is tuned to the design speed. The principle of the dynamically tuned suspension is described in the following equation: $\omega^2 J = K$, where $\omega$ represents the rotor angular velocity, J is the inner gimbal diametral moment of inertia and K is the angular stiffness of an aligned pair of flexure pivots. When this equation is satisfied by suitably adjusting either the speed of the motor or the stiffness of the flexure pivots or both, the restraints on the motion of the rotor are cancelled and the rotor becomes free to tilt, excluding windage effects. Hence, the gyroscopic system described represents a dynamically tuned free-rotor gyro.

The basic rotor suspension using gimbals and flexure pivots provides wide angular freedom. The combination of tuning and wide angle flexure pivots makes it possible to operate with very large gimbal angles at tolerable restraint levels. In turn, this permits the operation of the seeker-tracker gyro in a situation where the line of sight angle to the target is large, a common condition.

Surrounding the gyro rotor 26 is a ring-shaped torquer and pick-off stator 44 attached directly and coaxially on top of the housing 12. The torquer itself (not shown) is in the form of a solenoid (a toroid) with a single winding. The rotor 26 includes a cylindrical magnet (not shown) mounted on the ring-shaped rotor and polarized along a diameter thereof. When the solenoid of the stator 44 is energized, the diametrically polarized magnetic on the rotor 26 experiences a torque that tends to erect its magnetization vector into alignment with the solenoid field. Since the magnet on the rotor 26 is rotating, however, the direction of the torque also rotates at the rotor speed. Thus by pulsing the solenoid at the right time regarding the spin position of the rotor, torquing can be achieved on either of two orthogonal axes, or both, with negligible cross-coupling. The virtues of this torquing scheme are that it has a relatively large torquing rate capability and also is relatively low cost as a result of the construction simplicity characteristic to the configuration and low number of windings. The pick-off or read-out of the tilt angle of the rotor 26 relative to the spin axis a can be implemented with conventional techniques.

The radiometric portion of the unit in FIGS. 1–3 includes a Cassegrain antenna 45 having two separately mounted spinning reflectors and a stationary feed. A parabolic aperatured, concave primary reflector 46 is rigidly connected coaxially to the upper open end of the hollow drive shaft 14 extending above the gimbal and flexure pivot mounting arrangement 28. The much smaller hyperbolic convex secondary reflector 48 of the antenna 45 is coaxially mounted above and in opposition to the primary reflector 46, supported by four struts 50 connected through clearance holes 52 in the primary reflector 46 directly and rigidly to the rotor 26 below the primary reflector 46. The stationary antenna feed 54 is mounted at the open upper end of the hollow drive shaft 14 through a clearance hole 56 in the central bottom of the primary reflector 46.

Figure 6:
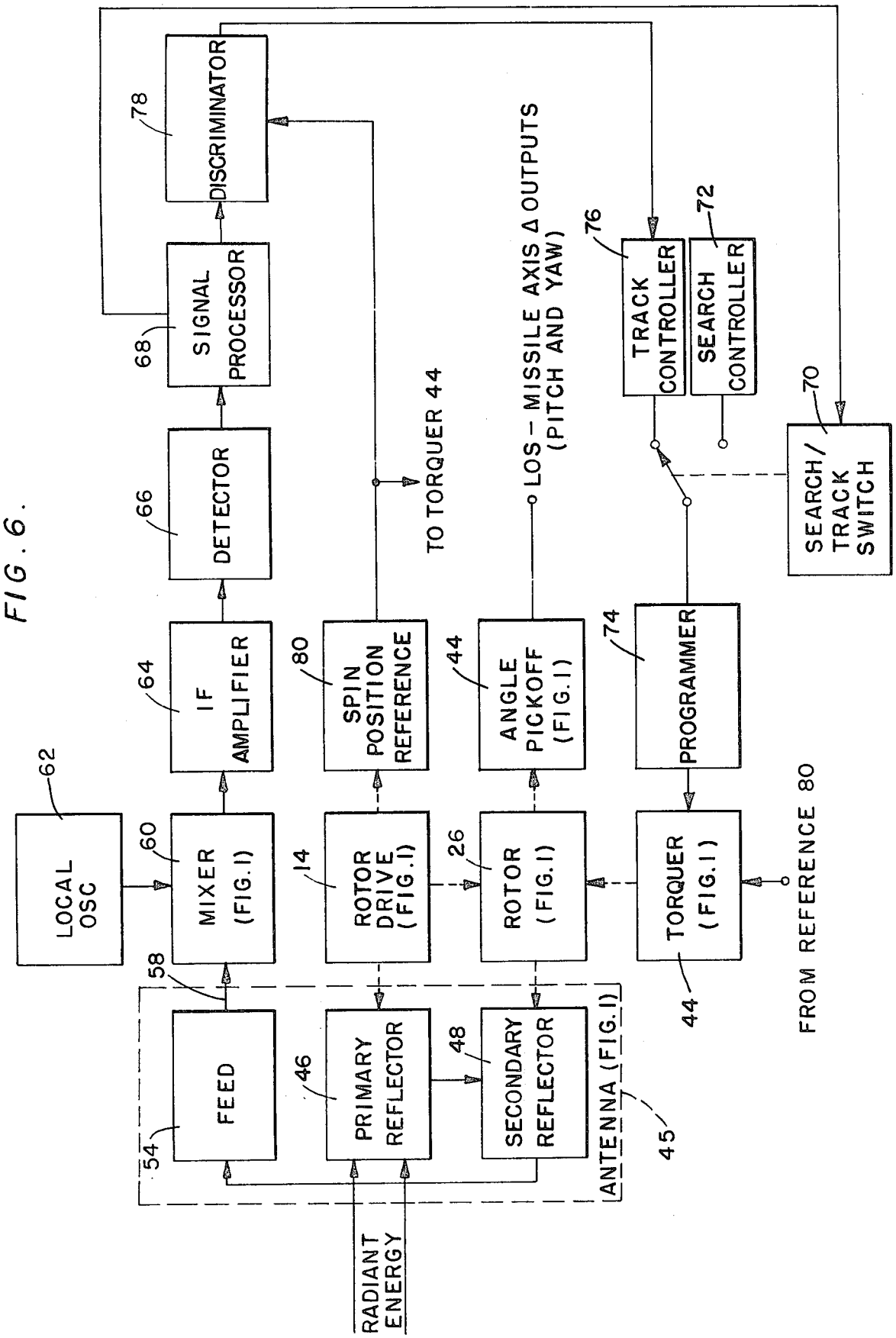
FIG. 6 is a functional block diagram of the mechanical and electrical equipment typically associated with the instrument of FIGS. 1–3.

Incoming radiation is reflected from the primary reflector 46 via the secondary reflector 48 to the feed 54, as indicated schematically in FIG. 6. The operation and theory of Cassegrain microwave antennas of this electrical design is described in Hannan, "Microwave Antennas derived from the Cassegrain Telescope", *IRE Proc. on Antennas and Propagation*, March 1961, pp. 140–153.

The feed 54 (FIGS. 1 and 3) is coupled to a stationary rectangular waveguide disposed inside of the hollow drive shaft 14 leading to a microwave demodulator or mixer 60 disposed inside of the hollow drive shaft 14 at its base. The intermediate frequency output of the microwave mixer 60 is electrically connected to the other electronic components in the compartment 22.

In practice, the integrated radiometric seeker gyro 10 is installed as in FIGS. 2 and 3 in a case 62 having a microwave transparent radome 64 covering the composite radiometric antenna 45.

Figure 7:
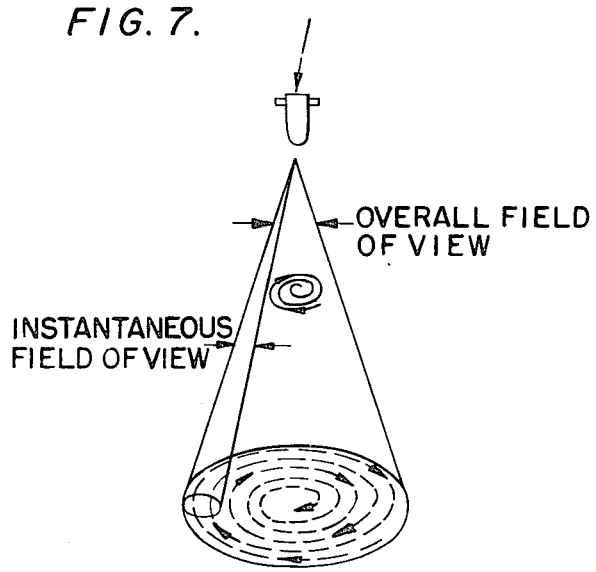
FIG. 7 is a schematic diagram illustrating a spiral scan pattern for the search mode of the instrument of FIGS. 1–3.
Figure 8:
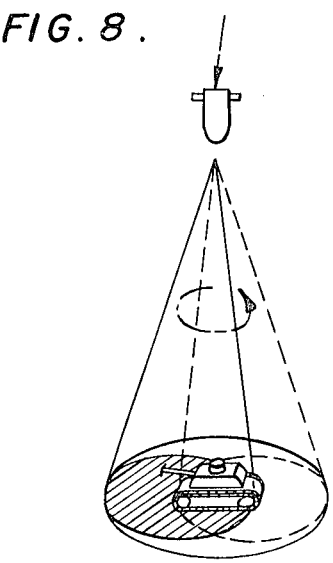
FIG. 8 is a schematic diagram illustrating a conical, circular scan pattern for the track mode of the instrument of FIGS. 1–3.

In FIG. 6 the functional components of the system are shown. The output of the antenna 45 from the feed 54 is passed via the waveguide 58 to the mixer 60 along with the output of a local oscillator 62. The output of the mixer 60 is passed via an intermediate frequency amplifier 64 to a detector 66 producing a D.C. output to a signal processor 68 which produces an output to indicate acquisition of a target having predetermined distinct radiometric properties. One of the outputs of the signal processor 68 is passed to a search/track electronic switch 70 which causes the scanning pattern of the instrument (i.e. the tilt motion of the rotor 26 off the spin axis) to be changed over from the initial search mode to the track mode when a target has been acquired. The search controller 72 prior to acquiring a target instructs a programmer 74 which controls the torquer 44 for the rotor 26. By applying the proper sequence of signals to the torquer 44 the programmer 74 causes the rotor to execute a spiral offset scan about the spin axis, which as shown in FIG. 7 causes the instantaneous field of view or beam direction to be swept in a sprial scan. The overall field of view in the search mode is about 50° by design. In the track mode after acquisition of a target the track instruction 76 is fed to the programmer 74 which now controls the torquer 44 in a different manner as shown in FIG. 8. The track scan is simply a circular scan of small diameter so that a solid cone, typically 5°, having less than twice the width of the instantaneous beam pattern is swept out. Unlike the automatic search mode, the track mode involves closed loop operation. A discriminator 78 receives the other output of the signal processor 68 and the angular spin position reference 80 of the rotor 14 to produce an output to the track controller 76. Because the reflectors of the antenna 45 are continuously rotating, the polarization of the incoming radiating energy produces an antenna output which depends on the spin or angular position of the rotor 14 about the spin axis a. This polarization information is used in the discriminator 78 for target discrimination. The spin position reference also produces an output to the torquer circuit 44 to establish the times at which pitch or yaw torque can be applied by energizing the solenoid. The basic object of the discriminator 78 is to keep an acquired target centered in the solid cone of the track scan (FIG. 8). When the target deviates from the center of the solid cone, an error signal is passed to the track controller 76 which causes the center of the track scan to be shifted so as to recenter the target. In the track mode the conventional gyro rotor pick-off 44 supplies proportional navigation information as pitch and yaw outputs to optimize the intercept course of the missile.

Because of the Cassegrain antenna design, the problem of a rotary joint for the feed is completely eliminated since the feed can be mounted in a fixed position relative to the gyro case. The large primary reflector is not a part of the inertial sensing rotor while the small secondary reflector tilts with the rotor and permits off-axis aiming of the beam pattern of the antenna. While the diameter of the primary reflector 46 in plane may be on the order of five inches in practice, the much smaller diameter of the secondary reflector contributes negligibly to the moment of inertia of the rotor. Because the primary and secondary reflector rotate continuously at exactly the same rate, the struts 50 for the secondary reflector 48 can simply extend through the clearance holes 52 in the primary reflector 46. The holes 52 should provide enough clearance between the reflector 46 and the struts 50 to allow rotor 26, struts 50 and secondary reflector 48 to undergo a maximum tilt off of the spin axis, to which the primary reflector 46, however, is constrained.

The advantage of the disclosed system is that it incorporates into a single compact package both the radiometric sensing function and the gyroscopic function necessary to control and optimize the intercept course of the missile. If these two functions were carried out by separate instruments, additional scanning drive mechanisms, pick-offs and inertial platforms would be necessary for the antenna system and additional computations for navigation would be required.

Those skilled in the art will recognize that various modifications of the preferred embodiments are possible without departing from the basic principles disclosed herein. For example, it may be desired in some applications to utilize an active radar antenna instead of a passive receiving antenna. Accordingly, the above disclosure is intended to be illustrative and not restrictive, the scope of the invention being indicated by the appended claims and all changes and modifications which fall within the range of equivalence are intended to be embraced therein.

We claim:

1. An integrated gyroscope and antenna system, comprising a gyroscope having a normally stationary case, a hollow drive shaft mounted to said case for rotation therein about a spin axis, means in said case for imparting rotation to said drive shaft about said spin axis, a rotor serving as an inertial mass, a flexible coupling for connecting said rotor to said shaft for rotation therewith, said flexible coupling permitting said rotor to tilt off said spin axis while rotating, stator means for torquing said rotor about axes other than said spin axis and for producing an output indicative of the tilt angle thereof, and a composite antenna including an apertured first reflector rigidly connected to the end of said drive shaft adjacent said rotor for rotation with said shaft, a second reflector spaced from said first reflector, support means rigidly connecting said second reflector to said rotor through said first reflector with sufficient clearance to permit maximum tilting of said second reflector with said rotor, antenna feed means stationary with respect to said case mounted in the open end of said hollow drive shaft and protruding through said first reflector, and waveguide means coupled at one end to said feed means extending within said hollow shaft, the opposite end of said waveguide means providing an electrical output and being rigidly interconnected with said case.

2. The system of claim 1, wherein said composite antenna is in the form of a Cassegrain antenna.

3. The system of claim 2, wherein said first reflector is a primary parabolic reflector and said second reflector is a hyperbolic secondary reflector.

4. The system of claim 1, further comprising programmed control means for providing control signals to said stator means to torque said rotor such that said rotor with said second reflector executes a predetermined scanning pattern about said spin axis.

5. The system of claim 4, wherein said predetermining scanning pattern is a spiral scan centered about said spin axis.

6. The system of claim 1, further comprising search/track control means, including a first programmed control means for producing signals to said stator to torque said rotor such that said rotor with said reflector executes a spiral scan motion about said spin axis in the search mode, second program control means for producing control signals to said stator means to torque said rotor such that said rotor with said second reflector executes a circular scan of predetermined lesser dimensions than the overall dimensions of said spiral scan in the track mode, signal processing means operatively receiving the output of said waveguide means for detecting the presence of a target to produce a control signal, switch means responsive to said detector control signal for switching from said first programmed control means to said second programmed control means to initiate said track mode when a target is detected and closed loop control means connected between said signal processing means and said second programmed control means for shifting the center of said circular scan in response to relative displacement of said target therefrom.

7. The system of claim 1, wherein said flexible coupling is a dynamically tuned free-rotor support.

8. The system of claim 7, wherein said rotor is a ring-shaped inertial mass normally coaxial with said spin axis and said flexible coupling includes an inner gimbal ring normally coaxial with said spin axis, a pair of aligned flexure pivots having a common axis which intersects said spin axis at right angles connecting said inner gimbal ring to said drive shaft, and a second pair of flexure pivots aligned orthogonally with respect to said first pair of pivots for connecting said ring-shaped rotor to said inner gimbal ring.

9. The system of claim 8, wherein each of said flexure pivots includes two mating cylindrical halves interconnected with transverse flexure beams for permitting rotation about the axis of said cylindrical halves.

* * * * *